United States Patent [19]

Senjo et al.

[11] 4,061,743
[45] * Dec. 6, 1977

[54] EXHAUST GAS SCRUBBING PROCESS

[75] Inventors: Teizo Senjo, Machida; Makio Kobayashi, Toyonaka, both of Japan

[73] Assignees: Fuji Kasui Engineering Co., Ltd., Tokyo; Sumitomo Metal Industries, Ltd., Osaka, both of Japan

[*] Notice: The portion of the term of this patent subsequent to July 12, 1994, has been disclaimed.

[21] Appl. No.: 679,777

[22] Filed: Apr. 23, 1976

[30] Foreign Application Priority Data

| May 6, 1975 | Japan | 50-53150 |
| May 6, 1975 | Japan | 50-53151 |
| Jan. 7, 1976 | Japan | 51-001200 |

[51] Int. Cl.² .................... C01B 21/00; C01B 17/00
[52] U.S. Cl. .................... 423/235; 423/242; 423/395
[58] Field of Search ............ 423/235, 351, 395, 242

[56] References Cited

U.S. PATENT DOCUMENTS

| 3,565,575 | 2/1971 | Warshaw | 423/235 |
| 3,801,696 | 4/1974 | Mark | 423/235 |
| 3,836,630 | 9/1974 | Noguchi et al. | 423/242 |
| 3,892,837 | 7/1975 | Uchiyama et al. | 423/242 |
| 3,932,585 | 1/1976 | Moriguchi et al. | 423/351 |
| 3,957,949 | 5/1976 | Senjo et al. | 423/235 |
| 4,035,470 | 7/1977 | Senjo et al. | 423/235 |

FOREIGN PATENT DOCUMENTS

| 594,137 | 3/1960 | Canada | 423/235 |
| 1,272,882 | 11/1960 | France | 423/235 |
| 2,353,528 | 5/1974 | Germany | 423/235 |
| 2,445,567 | 3/1975 | Germany | 423/235 |
| 45-11202 | 4/1970 | Japan | 423/235 |

Primary Examiner—O. R. Vertiz
Assistant Examiner—Eugene T. Wheelock
Attorney, Agent, or Firm—Armstrong, Nikaido & Marmelstein

[57] ABSTRACT

Nitrogen oxides, or both sulfur oxides and nitrogen oxides are efficiently and economically removed from exhaust gas containing the same with an aqueous scrubbing suspension of alkaline earth metal compounds. The aqueous scrubbing suspension of alkaline earth metal compounds further contains (a) thiourea or thiosulfates or mixtures thereof and (b) copper ion or iron ion or a mixture thereof.

10 Claims, No Drawings

EXHAUST GAS SCRUBBING PROCESS

The present invention relates to a wet type exhaust gas scrubbing process for removing nitrogen oxides ($NO_x$) containing nitrogen monoxide (NO) and nitrogen dioxide ($NO_2$) from exhaust gases containing the nitrogen oxides such as combustion exhaust gases, exhaust gases from metal dissolving and pickling plants, exhaust gases from various chemical processes and other industrial exhaust gases. More specifically, the present invention relates to a wet type process for removing nitrogen oxides from such exhaust gases, by oxidizing nitrogen monoxide (NO) into nitrogen dioxide ($NO_2$) and/or dinitrogen trioxide ($N_2O_3$) first and then by scrubbing the exhaust gases with an aqueous scrubbing suspension containing the sulfite of alkaline earth metal in a scrubbing column.

The present invention also relates to an exhaust gas scrubbing process for simultaneously removing sulfur oxides ($SO_x$) and nitrogen oxides ($NO_x$) from combustion exhaust gases containing the same such as flue gases from a boiler, a heating furnace, a sintering furnace, a roasting furnace, a converter, a smelting furnace, an incinerator or the like.

The conventional processes for the removal of nitrogen oxides from exhaust gases are of three main types, that is, (a) a reduction process which reduces $NO_x$ in the gas to nitrogen ($N_2$) with a catalyst and a reducing fuel, (b) an adsorption process which adsorbs $NO_x$ from the gas with an adsorbent such as activated carbon and (c) an absorption process which scrubs $NO_x$ from the gas with a suitable liquid absorbent. Of these processes, the absorption processes in which exhaust gases to be treated are scrubbed with liquid absorbents such as, water, an aqueous ammonium solution, an aqueous sodium hydroxide (NaOH) solution, an aqueous solution of $NaClO_x$ ($x=1$, 2 or 3), an aqueous ferrous sulfate ($FeSO_4$) solution or the like, in a spray column, a packed column or the other various scrubbers have been widely used.

However, a process for removing $NO_x$ from exhaust gases containing the same with the sulfite of alkaline earth metal, for example, calcium sulfite, at a high denitrogenation rate, is not known.

Various processes for removing $SO_x$ and/or $NO_x$ from exhaust gases are known in the art. The present inventors have also developed processes for simultaneously removing $NO_x$ and $SO_x$ from exhaust gases by using an aqueous scrubbing solution of, the carbonate (or hydroxide) and sulfite, of alkali metals or ammonium, such as those disclosed in Japanese Patent Laid-Open Publication No. 50-27763(1975).

However a process for simultaneously removing $SO_x$ and $NO_x$ from exhaust gases containing the same with the carbonate (or hydroxide) and the sulfite, of alkaline earth metal, at a high denitrogenation and desulfurization rate, is also not known.

Accordingly, an object of the present invention is to provide a process for the removal of $NO_x$ from exhaust gases, at a high denitrogenation rate, by using the sulfite of alkaline earth metals, especially calcium sulfite available at a low cost in the market.

Another object of the present invention is to provide a process for simultaneously removing $SO_x$ and $NO_x$ from combustion exhaust gases, at a high denitrogenation and desulfurization rate, by using the carbonate or hydroxide and the sulfite, of alkaline earth metals in a single scrubbing column.

Other objects and advantages of the present invention will be apparent from the following description.

In accordance with the present invention, there is provided a process for removing nitrogen oxides including nitrogen monoxide and nitrogen dioxide from exhaust gas containing the same comprising the steps of:

a. oxidizing the nitrogen monoxide into nitrogen dioxide, dinitrogen trioxide or a mixture thereof by adding an oxidizing agent to the exhaust gas, and; then, b. contacting, in a scrubbing column, the gas with an aqueous scrubbing suspension having a pH of not less than 4.5 and containing (i) the sulfite of at least one alkaline earth metal, (ii) thiourea or thiosulfate of alkali metals, alkaline earth metals and ammonium or mixture thereof and (iii) copper ion or iron ion or a mixture thereof.

In accordance with the preferred embodiment of the present process for removing $NO_x$ from exhaust gases, at least a portion of said aqueous scrubbing suspension is subjected to a solid-liquid separation process to separate the sulfate of alkaline earth metals which is produced, in the scrubbing suspension, by the reaction of nitrogen oxides with the sulfite of alkaline earth metals and the resultant liquid is circulated into the scrubbing column as the scrubbing suspension.

In accordance with the present invention, there is also provided a process for simultaneously removing sulfur oxides and nitrogen oxides from exhaust gas containing the same comprising the steps of:

a. oxidizing nitrogen monoxide contained in the nitrogen oxides into nitrogen dioxide, dinitrogen trioxide or mixture thereof by adding an oxidizing agent to the exhaust gas, and; then, b. contacting, in a scrubbing column, the gas with an aqueous scrubbing suspension having a pH of not less than 4.5 and containing (i) the hydroxide or carbonate or mixture thereof, of at least one alkaline earth metal and the sulfite of at least one alkaline earth metal, (ii) thiourea or thiosulfate of alkali metals, alkaline earth metals and ammonium or mixtures thereof and (iii) copper ion or iron or a mixture thereof.

In accordance with the preferred embodiment of the present process for simultaneously removing $SO_x$ and $NO_x$ from combustion exhaust gases, at least a portion of said aqueous scrubbing suspension is subjected to a solid-liquid separation process to separate the sulfate of alkaline earth metals which is produced, in the scrubbing suspension, by the reaction of nitrogen oxides with the sulfite of alkaline earth metals and the resultant liquid is circulated into the scrubbing column as the scrubbing suspension.

Previously, the denitrogenation rate, when the sulfite of alkaline earth metal is used as the gas scrubbing agent, was extremely low and generally, for example, was approximately 20% in the case of calcium sulfite. Therefore, in order to increase the denitrogenation rate in the case where the sulfite of alkaline earth metals is used as a scrubbing agent, the process for removing $NO_x$ from exhaust gases by using the sulfite of alkaline earth metals was eagerly and throughly studied and developed by the present inventors. As a result, it has been found that by using an aqueous scrubbing suspension containing thiourea and/or thiosulfate, and copper ion and/or iron ion, in addition to the sulfite of alkaline earth metals, $NO_x$ can be removed from exhaust gases at a denitrogenation rate of 85% or more.

Although the denitrogenation rate increases when exhaust gas containing nitrogen oxides is scrubbed with an aqueous scrubbing suspension containing thiourea or thiosulfate in addition to the sulfite of alkaline earth metals, it is still not suitable for practical use. For instance, in the case where an aqueous scrubbing suspension containing calcium sulfite and thiourea or thiosulfate is used, the denitrogenation rate is approximately 50%. In addition, when copper ion or iron ion is introduced into an aqueous scrubbing suspension of the sulfite of alkaline earth metals, the denitrogenation rate increases compared to the scrubbing suspension containing no copper or iron ion, but it still remains at a low level. For instance, in the case where an aqueous scrubbing suspension containing calcium sulfite and copper or iron ion is used as the scrubbing agent, the denitrogenation rate is approximately 40%.

Contrary to the above, in the case where an aqueous scrubbing suspension containing thiourea or thiosulfate, and copper or iron ion, in addition to the sulfite of alkaline earth metals is used for removing nitrogen oxides from exhaust gases, a remarkably high denitrogenation rate can be obtained. For instance, in the case where exhaust gas containing nitrogen oxides is scrubbed with an aqueous scrubbing suspension containing calcium sulfite, thiourea and copper ion, $NO_x$ can be removed from the exhaust gas at a denitrogenation rate of 90% or more. That is, it has been found that, when a combination of thiourea or thiosulfate and copper or iron ion is incorporated into an aqueous scrubbing suspension of the sulfite of alkaline earth meltals, these additives show a catalytic effect with respect to the denitrogenation reaction.

The main reaction for removing nitrogen oxides in the present process is represented by the following equations (1) and (2):

$$NO_2 + 2MSO_3 \rightarrow 2MSO_4 + \tfrac{1}{2} N_2 \tag{1}$$

$$N_2O_3 + 3MSO_3 \rightarrow 3MSO_4 + N_2 \tag{2}$$

wherein M represents alkaline earth metals such as calcium, magnesium and the like.

Thus, an oxidizing agent such as chlorine dioxide ($ClO_2$) or ozone ($O_3$) if firstly added to the exhaust gas containing NO at, for example, the feeding pipe or duct through which the exhaust gas is fed into a scrubber, to oxidize nitrogen monoxide (NO) into nitrogen dioxide ($NO_2$) and/or dinitrogen trioxide ($N_2O_3$). These oxidation reactions are shown as follows.

$$2NO + ClO_2 + H_2O \rightarrow NO_2 + HCl + HNO_3 \tag{3}$$

$$NO + O_3 \rightarrow NO_2 + O_2 \tag{4}$$

$$2NO + O_3 \rightarrow N_2O_3 + O_2 \tag{5}$$

In the preferred embodiment of the present process, the molar ratio of $ClO_2$ to NO is controlled so as to be substantially 0.5, and that of $O_3$ to NO is controlled so as to be substantially between 0.5 and 1.0.

Then, $NO_2$ and/or $N_2O_3$ thus oxidized and originally contained in the exhaust gas are secondly scrubbed with an aqueous scrubbing suspension containing the sulfite of alkaline earth metals, and thiourea and/or thiosulfates, and copper ion and/or iron ion, in the scrubber. The scrubber employed in the present process can be any conventional scrubber or absorber which is heretofore used for gas scrubbing or absorbing processes, but we prefer to use a Moredana plate column (i.e. a perforated plate or grid plate column without weir and downcomer having a large free-space ratio such as 0.30–0.60) under the undulation region described in U.S. Pat. No. 3,892,837, issued July 1, 1975.

The present denitrogenation process can be applied to exhaust gases containing both $SO_x$ and $NO_x$, such as combustion exhaust gases, as well as exhaust gas containing $NO_x$ alone.

Further, the reaction for removing sulfur oxides from the exhaust gas in the present simultaneous desulfurization and denitrogenation process is represented by the following equations (6) and (7):

$$M(OH)_2 + SO_2 \rightarrow MSO_3 + H_2O \tag{6}$$

$$MCO_3 + SO_2 \rightarrow MSO_3 + CO_2 \tag{7}$$

wherein M represents the same as defined above.

Thus, sulfur dioxide ($SO_2$) contained in the exhaust gas is absorbed into an aqueous scrubbing suspension as the sulfite of alkaline earth metals by scrubbing the gas, in the scrubber, with the aqueous scrubbing suspension containing the hydroxide or carbonate of alkaline earth metals together with the denitrogenation agent. In fact, as a large quantity of carbon dioxide ($CO_2$) contained in, for example, a combustion exhaust gas is dissolved in the scrubbing suspension, said hydroxide or carbonate is converted into the bicarbonate of alkaline earth metals by the reaction with the dissolved $CO_2$. Therefore, $SO_2$ contained in the exhaust gas is mainly scrubbed with the bicarbonate of alkaline earth metals as shown in the following reaction (8).

$$M(HCO_3)_2 + SO_2 \rightarrow MSO_3 + 2CO_2 + H_2O \tag{8}$$

Further, the resultant sulfite of alkaline earth metals ($MSO_3$) in the desulfurization reactions (6), (7) and (8) can be directly used as a reducing agent for reducing $NO_2$ and/or $N_2O_3$ to $N_2$, as set forth in the equations (1) and (2). In the case where an exhaust gas containing a relatively large amount of $SO_x$ compared to $NO_x$ is subjected to the simultaneous desulfurization and denitrogenation process of the present invention, there is an advantage that there is no need of the additional sulfite.

The thiosulfates employed in the present process include, for example, sodium thiosulfate ($Na_2S_2O_3$), potassium thiosulfate ($K_2S_2O_3$), calcium thiosulfate ($CaS_2O_3$), magnesium thiosulfate ($MgS_2O_3$), ammonium thiosulfate (($NH_4)_2S_2O_3$) and the like.

The copper ion and/or iron ion employed in the present process can be incorporated into the scrubbing suspension in the form of, for example, cuprous sulfate, cupric sulfate, cuprous chloride, cupric chloride, ferrous sulfate, ferric sulfate, ferrous chloride, ferric chloride and the like, or the chelate compounds or complex compounds of copper or iron. The chelating agent to be employed in the present process includes any conventional chelating agents such as, for example, ethylene diamine tetraacetic acid (EDTA) [($CH_2)_2N_2(CH_2COOH)_4$], citric acid ($C_6H_8O_7$), tartaric acid ($C_4H_6O_6$), gluconic acid ($C_6H_{12}O_7$) and the like. The complex compound of copper or iron includes, for example, cupro-ammonium complex [$Cu(NH_3)_4$]$^{2+}$, ferrocyano complex [$Fe(CN)_6$]$^{4-}$ and the like.

In the present process for removing $NO_x$, or $NO_x$ and $SO_x$ from exhaust gases, the pH of the aqueous scrubbing suspension is not less than 4.5, and preferably in the range from 5 to 9. When the pH of the scrubbing suspension is less than 4.5, the denitrogenation rate and the desulfurization rate undesirably decrease because the bisulfite ion is remarkably formed in an equilibrium relationship between the sulfite ion and the bisulfite ion. When the pH of the scrubbing suspension is more than 9, a large amount of alkali compounds in the scrubbing suspension is wastefully consumed in neutralizing the $CO_2$ contained in the exhaust gases.

In the present process for removing $NO_x$, or $NO_x$ and $SO_x$ from exhaust gases, the content of the sulfite contained in the scrubbing suspension is not less than 0.005 mol/liter, and preferably 0.01 mol/liter or more, based on the total volume of the suspension. When the content of the sulfite is less than 0.005 mol/liter, the denitrogenation rate decreases to such an extent that it is not acceptable for practical use.

In the present process for removing $NO_x$, or $NO_x$ and $SO_x$ from exhaust gases, the content of the thiourea or the thiosulfate contained in the scrubbing suspension is not less than 0.03 mol/liter, and preferably in the range from 0.05 to 0.4 mol/liter, based on the total volume of the suspension. When the content of the thiourea or the thiosulfate is less than 0.03 mol/liter, the rate of denitrogenation undesirably decreases. Even if the content of the thiourea or the thiosulfate is more than 0.4 mol/liter, the denitrogenation effect is substantially saturated, so that it is not economical.

The content of the copper ion or the iron ion contained in the scrubbing solution employed in the present process, is not less than 0.003 mol/liter, and preferably in the range from 0.01 to 0.04 mol/liter, based on the total volume of the suspension. When the content of the copper ion or the iron ion is less than 0.003 mol/liter, the rate of denitrogenation decreases to such an extent that it is not preferable for practical use. Contrary to this, when the content of the copper ion or the iron ion is more than 0.04 mol/liter, the denitrogenation effect does not substantially increase and, therefore, it is not economical for practical use.

In the preferred embodiment of the present process for removing $NO_x$ or $NO_x$ and $SO_x$ from exhaust gases, the aqueous scrubbing suspension is circulated in the scrubber. For this reason, at least a portion of the circulating scrubbing suspension is taken out from the scrubbing system and, then, is subjected to a solid-liquid separation treatment. Thus, a solid mainly containing the sulfate of alkaline earth metals ($MSO_4$) formed in the equations (1) and (2) is separated from the suspension and the resultant liquid is fed back to the scrubbing system. The solid-liquid separation of the scrubbing suspension can be easily carried out by using any conventional technique for separating solid from suspension, such as, for example, a filter, a centrifugal separator, a sedimentation separator and the like.

The present invention is further illustrated by, but by no means limited to, the following Examples.

EXAMPLE 1

Gas absorption tests were conducted by bubbling air containing 200 ppm by volume of $NO_2$ gas into an aqueous absorbing suspension containing 0.03 mol/liter of calcium sulfite and various aqueous absorbing suspensions further containing thiourea or EDTA-$Cu^{2+}$ compound, or thiourea and EDTA-$Cu^{2+}$ compound. In the tests 10 liter/min of the air containing 200 ppm of $NO_2$ gas was bubbled into absorption bottles containing 500 ml of the absorbing suspensions.

The rate of denitrogenation was obtained by determining the concentrations of $NO_2$ gas at the inlet and outlet of the absorbing bottle by means of chemical-luminescence type nitrogen oxides analyzer. The results, which show typical effects of the addition of both thiourea and EDTA-$Cu^{2+}$ compound, are presented in Table 1.

Table 1

| Run No. | Content of aqueous absorbing suspension (mol/liter) | | pH of aqueous absorbing suspension | Denitrogenation rate (%) |
| --- | --- | --- | --- | --- |
| 1 | $CaSO_3$ | 0.03 | 6.7 | 20 |
| 2 | $CaSO_3$ | 0.03 | 6.7 | 45 |
|   | thiourea | 0.10 |   |   |
| 3 | $CaSO_3$ | 0.03 | 6.7 | 44 |
|   | EDTA-$Cu^{2+}$ | 0.02 |   |   |
| 4 | $CaSO_3$ | 0.03 | 6.7 | 92 |
|   | thiourea | 0.10 |   |   |
|   | EDTA-$Cu^{2+}$ | 0.02 |   |   |
| 5 | $CaSO_3$ | 0.03 | 5.4 | 91 |
|   | thiourea | 0.20 |   |   |
|   | EDTA-$Cu^{2+}$ | 0.03 |   |   |
| 6 | $CaSO_3$ | 0.03 | 5.4 | 92 |
|   | thiourea | 0.20 |   |   |
|   | EDTA-$Cu^{2+}$ | 0.04 |   |   |
| 7 | $CaSO_3$ | 0.03 | 8.0 | 91 |
|   | thiourea | 0.15 |   |   |
|   | EDTA-$Cu^{2+}$ | 0.04 |   |   |
| 8 | $CaSO_3$ | 0.03 | 8.0 | 90 |
|   | thiourea | 0.15 |   |   |
|   | EDTA-$Cu^{2+}$ | 0.03 |   |   |

EXAMPLE 2

Gas absorption tests were conducted by bubbling air containing approximately 200 ppm by volume of $NO_2$ gas into an aqueous absorbing suspension containing 0.05 mol/liter of calcium sulfite and various aqueous absorbing suspensions further containing thiourea or sodium thiosulfate and copper or iron ion. In the tests 10 liter/min of the air containing $NO_2$ gas was bubbled into absorption bottles containing 500 ml of the absorbing suspensions.

The rate of denitrogenation was determined by measuring the concentrations of the inlet and the outlet gas of the absorption bottle by means of chemical-luminescence type nitrogen oxides analyzer. The results are shown in Table 2, from which the typical effects of the addition of thiourea or sodium thiosulfate and copper or iron ion will be clearly understood.

Table 2

| Run No. | Content of aqueous absorbing suspension (mol/liter) | | pH of aqueous suspension | $NO_2$ content in bubbled air (ppm) | Denitrogenation rate (%) |
| --- | --- | --- | --- | --- | --- |
| 1 | $CaSO_3$ | 0.05 | 6.5 | 195 | 20 |
| 2 | $CaSO_3$ | 0.05 | 6.5 | 197 | 47 |
|   | thiourea | 0.15 |   |   |   |
| 3 | $CaSO_3$ | 0.05 | 6.5 | 202 | 42 |
|   | CuCl | 0.035 |   |   |   |
| 4 | $CaSO_3$ | 0.05 | 6.5 | 200 | 94 |
|   | thiourea | 0.15 |   |   |   |
|   | CuCl | 0.035 |   |   |   |
| 5 | $CaSO_3$ | 0.05 | 6.5 | 205 | 85 |
|   | thiourea | 0.15 |   |   |   |
|   | $FeCl_2$ | 0.035 |   |   |   |
| 6 | $CaSO_3$ | 0.05 | 6.5 | 203 | 92 |
|   | $Na_2S_2O_3$ | 0.15 |   |   |   |
|   | CuCl | 0.035 |   |   |   |
| 7 | $CaSO_3$ | 0.05 | 6.5 | 198 | 86 |
|   | $Na_2S_2O_3$ | 0.15 |   |   |   |
|   | $FeCl_2$ | 0.035 |   |   |   |
| 8 | $CaSO_3$ | 0.05 | 6.5 | 203 | 92 |
|   | thiourea | 0.07 |   |   |   |
|   | $Na_2S_2O_3$ | 0.07 |   |   |   |
|   | CuCl | 0.035 |   |   |   |
| 9 | $CaSO_3$ | 0.05 | 6.5 | 200 | 95 |
|   | thiourea | 0.15 |   |   |   |
|   | CuCl | 0.02 |   |   |   |

Table 2-continued

| Run No. | Content of aqueous absorbing suspension (mol/liter) | | pH of aqueous suspension | $NO_2$ content in bubbled air (ppm) | Denitrogenation rate (%) |
|---|---|---|---|---|---|
| | $FeCl_2$ | 0.02 | | | |

EXAMPLE 3

Gas absorption tests were conducted by bubbling air containing approximately 200 ppm by volume of $NO_2$ gas into an aqueous absorbing suspension containing 0.18 mol/liter of calcium sulfite and various aqueous absorbing suspensions further containing thiourea or EDTA-$Cu^{2+}$ compound, or thiourea and EDTA-$Cu^{2+}$ compound. In the tests 10 liter/min of the air containing $NO_2$ gas was bubbled into absorption bottles containing 500 ml of the absorbing suspensions.

The rate of denitrogenation was determined by measuring the concentrations of the inlet and the outlet gas of the absorption bottle by means of chemical-luminescence type nitrogen oxides analyzer. The results are shown in Table 3, from which the typical effects of the addition of thiourea and EDTA-$Cu^{2+}$ will be clearly understood.

Table 3

| Run No. | Content of aqueous absorbing suspension (mol/liter) | | pH of aqueous absorbing suspension | Denitrogenation rate (%) |
|---|---|---|---|---|
| 1 | $CaSO_3$ | 0.18 | 6.7 | 23 |
| 2 | $CaSO_3$ | 0.18 | 6.7 | 47 |
|   | thiourea | 0.13 | | |
| 3 | $CaSO_3$ | 0.18 | 6.7 | 46 |
|   | EDTA-$Cu^{2+}$ | 0.02 | | |
| 4 | $CaSO_3$ | 0.18 | 6.7 | 93 |
|   | thiourea | 0.13 | | |
|   | EDTA-$Cu^{2+}$ | 0.02 | | |
| 5 | $CaSO_3$ | 0.18 | 5.4 | 92 |
|   | thiourea | 0.20 | | |
|   | EDTA-$Cu^{2+}$ | 0.03 | | |
| 6 | $CaSO_3$ | 0.18 | 5.4 | 93 |
|   | thiourea | 0.26 | | |
|   | EDTA-$Cu^{2+}$ | 0.04 | | |
| 7 | $CaSO_3$ | 0.18 | 8.0 | 92 |
|   | thiourea | 0.26 | | |
|   | EDTA-$Cu^{2+}$ | 0.04 | | |
| 8 | $CaSO_3$ | 0.18 | 8.0 | 91 |
|   | thiourea | 0.20 | | |
|   | EDTA-$Cu^{2+}$ | 0.03 | | |

EXAMPLE 4

Gas absorption tests were conducted by bubbling air containing approximately 200 ppm by volume of $NO_2$ gas into an aqueous absorbing suspension containing 0.37 mol/liter of calcium sulfite and various aqueous absorbing suspensions further containing thiourea or sodium thiosulfate, and the EDTA chelate compound of copper or iron. In the tests 10 liter/min of the air containing $NO_2$ gas was bubbled into absorption bottles containing 500 ml of the absorbing suspensions.

The rate of denitrogenation was determined by measuring the concentrations of the inlet and the outlet gas of the absorption bottle by means of chemical-luminescence type nitrogen oxides analyzer. The results are shown in Table 4, from which the typical effects of the addition of thiourea or sodium thiosulfate and the EDTA chelate compound of copper or iron will be clearly understood.

Table 4

| Run No. | Content of aqueous absorbing suspension (mol/liter) | | pH of aqueous suspension | $NO_2$ content in bubbled air (ppm) | Denitrogenation rate (%) |
|---|---|---|---|---|---|
| 1 | $CaSO_3$ | 0.37 | 6.5 | 195 | 23 |
| 2 | $CaSO_3$ | 0.37 | 6.5 | 197 | 48 |
|   | thiourea | 0.15 | | | |
| 3 | $CaSO_3$ | 0.37 | 6.5 | 200 | 46 |
|   | EDTA-$Cu^{2+}$ | 0.035 | | | |
| 4 | $CaSO_3$ | 0.37 | 6.5 | 198 | 94 |
|   | thiourea | 0.15 | | | |
|   | EDTA-$Cu^{2+}$ | 0.035 | | | |
| 5 | $CaSO_3$ | 0.37 | 6.5 | 198 | 86 |
|   | thiourea | 0.15 | | | |
|   | EDTA-$Fe^{2+}$ | 0.035 | | | |
| 6 | $CaSO_3$ | 0.37 | 6.5 | 200 | 90 |
|   | $Na_2S_2O_3$ | 0.15 | | | |
|   | EDTA-$Cu^{2+}$ | 0.035 | | | |
| 7 | $CaSO_3$ | 0.37 | 6.5 | 197 | 85 |
|   | $Na_2S_2O_3$ | 0.15 | | | |
|   | EDTA-$Fe^{2+}$ | 0.035 | | | |
| 8 | $CaSO_3$ | 0.37 | 6.5 | 200 | 92 |
|   | thiourea | 0.07 | | | |
|   | $Na_2S_2O_3$ | 0.07 | | | |
|   | EDTA-$Cu^{2+}$ | 0.035 | | | |
| 9 | $CaSO_3$ | 0.37 | 6.5 | 198 | 95 |
|   | thiourea | 0.15 | | | |
|   | EDTA-$Cu^{2+}$ | 0.02 | | | |
|   | EDTA-$Fe^{2+}$ | 0.02 | | | |

EXAMPLE 5

10,000 $Nm^3$/hr of exhaust gas from a metal pickling plant containing 250 ppm by volume of NO and 100 ppm by volume of $NO_2$ was denitrogenated in accordance with the present process. 130 ppm by volume of $ClO_2$ gas was continuously added to the exhaust gas at a feeding duct through which the gas was fed into a scrubber, whereby NO contained in the gas was converted into $NO_2$. Then, the exhaust gas was continuously fed to the bottom of a scrubbing column comprising three Moredana plates (a perforated plate without weir and downcomer) having a free space ratio (plate opening area/column cros-sectional area) of 0.38, wherein the exhaust gas was brought into countercurrent contact with a circulating aqueous scrubbing suspension having the composition given below under the following conditions.

| | |
|---|---|
| Superficial gas velocity in the column | 5 m/sec |
| Liquid-gas ratio (L/G) in the column | 4 |
| pH of the scrubbing suspension | 6.2 |
| Composition of the circulating scrubbing suspension (mol/liter) | |
| $CaSO_3$ | 0.05 |
| $CaSO_4$ | 0.5 |
| EDTA-$Fe^{2+}$ | 0.03 |
| $Na_2S_2O_3$ | 0.15 |

The $NO_x$ content in the outlet gas from the Moredana scrubbing column was 20 ppm or less.

Contrary to this, when a gas scrubbing test of the above exhaust gas was repeated using the same procedure as set forth above, except that the EDTA-$Fe^{2+}$ compound and $Na_2S_2O_3$ were not incorporated into the scrubbing suspension, the $NO_x$ content in the outlet gas from the Moredana scrubbing column was 180 ppm.

In the above gas scrubbing test of this invention, the make-up amount of calcium sulfite ($CaSO_3$) was 30 kg/hr.

The circulating scrubbing suspension was continuously taken out from the system at a rate of 85 liter/hr and, then, was filtered by using a filter press. The solid calcium sulfate was separated and the resultant filtrate was recirculated to a circulating tank of the scrubbing suspension.

The calcium sulfite contained in the separated solid was oxidized to calcium sulfate and was recovered. The amount of $CaSO_4.2H_2O$ thus obtained was 43 kg/hr.

EXAMPLE 6

10,000 Nm³/hr of exhaust gas from an industrial plant containing 250 ppm by volume of NO and 100 ppm by volume of $NO_2$ was denitrogenated in accordance with the present process. 260 ppm by volume of $O_3$ gas was continuously added to the exhaust gas at a feeding duct through which the gas was fed into a scrubber, whereby NO contained in the gas was converted into $NO_2$. Then, the exhaust gas was continuously fed to the bottom of a scrubbing column comprising three Moredana plates (a perforated plate without weir and downcomer) having a free space ratio of 0.38, wherein the exhaust gas was brought into countercurrent contact with a circulating aqueous scrubbing suspension having the composition given below under the following conditions.

| | |
|---|---|
| Superficial gas velocity in the column | 5 m/sec |
| Liquid-gas ratio (L/G) in the column | 4 |
| pH of the scrubbing suspension | 6.2 |
| Composition of the circulating scrubbing suspension (mol/liter) | |
| $CaSO_3$ | 0.05 |
| $CaSO_4$ | 0.5 |
| EDTA-$Cu^{2+}$ | 0.03 |
| thiourea | 0.15 |

The $NO_x$ content in the outlet gas from the Moredana scrubbing column was 16 ppm or less.

The make-up amount of calcium sulfite ($CaSO_3$) was 36 kg/hr.

The circulating scrubbing suspension was continuously taken out from the system at a rate of 100 liter/hr and, then, was filtered by using a filter press. The solid calcium sulfate was separated and the resultant filtrate was recirculated to a circulating tank of the scrubbing suspension.

The calcium sulfite contained in the separated solid was oxidized to calcium sulfate ($CaSO_4.2H_2O$) and was recovered. The amount of $CaSO_4.2H_2O$ thus obtained was 52 kg/hr.

EXAMPLE 7

10,000 Nm³/hr of exhaust gas from a metal pickling plant containing 250 ppm by volume of NO and 100 ppm by volume of $NO_2$ was denitrogenated in accordance with the present process. 130 ppm by volume of $ClO_2$ gas was continuously added to the exhaust gas at a feeding duct through which the gas was fed into a scrubber, whereby NO contained in the gas was converted into $NO_2$. Then, the exhaust gas was continuously fed to the bottom of a scrubbing column comprising three Moredana plates (a perforated plate without weir and downcomer) having a free space ratio of 0.38, wherein the exhaust gas was brought into countercurrent contact with a circulating aqueous scrubbing suspension having the composition given below under the following conditions.

| | |
|---|---|
| Superficial gas velocity in the column | 5 m/sec |
| Liquid-gas ratio (L/G) in the column | 4 |
| pH of the scrubbing suspension | 6.2 |
| Composition of the circulating scrubbing suspension (mol/liter) | |
| $CaSO_3$ | 0.5 |
| EDTA-$Cu^{2+}$ | 0.03 |
| thiourea | 0.15 |

The $NO_x$ content in the outlet gas from the Moredana scrubbing column was 15 ppm or less (denitrogenation rate 95.7%).

Contrary to this, when a gas scrubbing test of the above exhaust gas was repeated using the same procedure as set forth above, except that the EDTA-$Cu^{2+}$ compound and thiourea were not incorporated into the scrubbing suspension, the $NO_x$ content in the outlet gas from the Moredana scrubbing column was 180 ppm (denitrogenation rate 48.6%).

As is apparent from the above results, the symergetic effect of thiourea and copper ion with respect to the denitrogenation is remarkable in the case where calcium sulfite is used as a scrubbing agent.

EXAMPLE 8

Gas absorption tests were conducted by bubbling air containing 500 ppm by volume of $NO_2$ gas and 1000 ppm by volume of $SO_2$ gas into an aqueous absorbing suspension containing 0.18 mol/liter of calcium sulfite, 0.2 mol/liter of calcium carbonate and various aqueous absorbing suspensions further containing thiourea or EDTA chelate compound of copper or mixture thereof. In the tests 10 liter/min of the air containing $NO_2$ gas was bubbled into absorption bottles containing 500 ml of the absorbing suspensions.

The concentrations of $NO_2$ and $SO_2$ of the inlet and the outlet gas of the absorption bottle were measured by means of a chemical-luminescence type nitrogen oxides analyzer and a conductometric type sulfur oxides analyzer, respectively. The results are shown in Table 5, where it can be seen that the typical effects of the addition of thiourea and the EDTA chelate compound of copper were confirmed.

Table 5

| Run No. | Content of aqueous absorbing suspension (mol/liter) | | pH of aqueous suspension | Desulfurization rate (%) | Denitrogenation rate (%) |
|---|---|---|---|---|---|
| 1 | $CaSO_3$ | 0.18 | 6.7 | 98 | 23 |
|   | $CaCO_3$ | 0.2 | | | |
| 2 | $CaSO_3$ | 0.18 | 6.7 | 98 | 47 |
|   | $CaCO_3$ | 0.2 | | | |
|   | thiourea | 0.13 | | | |
| 3 | $CaSO_3$ | 0.18 | 6.7 | 98 | 46 |
|   | $CaCO_3$ | 0.2 | | | |
|   | EDTA-$Cu^{2+}$ | 0.02 | | | |
| 4 | $CaSO_3$ | 0.18 | 6.7 | 98 | 93 |
|   | $CaCO_3$ | 0.2 | | | |
|   | thiourea | 0.13 | | | |
|   | EDTA-$Cu^{2+}$ | 0.02 | | | |
| 5 | $CaSO_3$ | 0.18 | 5.4 | 98 | 92 |
|   | $CaCO_3$ | 0.2 | | | |
|   | thiourea | 0.13 | | | |
|   | EDTA-$Cu^{2+}$ | 0.02 | | | |
| 6 | $CaSO_3$ | 0.18 | 5.4 | 98 | 93 |
|   | $CaCO_3$ | 0.2 | | | |
|   | thiourea | 0.2 | | | |
|   | EDTA-$Cu^{2+}$ | 0.03 | | | |
| 7 | $CaSO_3$ | 0.18 | 5.4 | 98 | 93 |
|   | $CaCO_3$ | 0.2 | | | |
|   | thiourea | 0.26 | | | |
|   | EDTA-$Cu^{2+}$ | 0.04 | | | |
| 8 | $CaSO_3$ | 0.18 | 8.0 | 98 | 92 |
|   | $CaCO_3$ | 0.2 | | | |
|   | thiourea | 0.26 | | | |
|   | EDTA-$Cu^{2+}$ | 0.04 | | | |
| 9 | $CaSO_3$ | 0.18 | 8.0 | 98 | 91 |
|   | $CaCO_3$ | 0.2 | | | |
|   | thiourea | 0.26 | | | |
|   | EDTA-$Cu^{2+}$ | 0.03 | | | |

EXAMPLE 9

Gas absorption tests were conducted by bubbling air containing 500 ppm by volume of $NO_2$ gas and 1000 ppm by volume of $SO_2$ gas into an aqueous absorbing suspension containing 0.37 mol/liter of calcium sulfite, 0.20 mol/liter of calcium carbonate and various aqueous absorbing suspensions further containing thiourea or sodium thiosulfate and copper or iron ion. In the tests 10 liter/min of the air containing $NO_2$ gas was bubbled into absorption bottles containing 500 ml of the absorbing suspensions. The concentrations of $NO_2$ and $SO_2$ of the inlet and the outlet gas of the absorption bottle were measured by means of a chemical-luminescence type nitrogen oxides analyzer and a conductomeric type sulfur oxides analyzer, respectively. The results are shown in Table 6, where it can be seen that the typical effects of the addition of thiourea or sodium thiosulfate and copper or iron ion were confirmed.

Table 6

| Run No. | Content of aqueous absorbing suspension | (mol/liter) | pH of aqueous absorbing suspension | Desulfurization rate (%) | Denitrogenation rate (%) |
|---|---|---|---|---|---|
| 1 | $CaSO_3$ | 0.37 | 6.5 | 98 | 23 |
|   | $CaCO_3$ | 0.2 |   |   |   |
| 2 | $CaSO_3$ | 0.37 | 6.5 | 98 | 50 |
|   | $CaCO_3$ | 0.2 |   |   |   |
|   | thiourea | 0.15 |   |   |   |
| 3 | $CaSO_3$ | 0.37 | 6.5 | 98 | 47 |
|   | $CaCO_3$ | 0.2 |   |   |   |
|   | CuCl | 0.035 |   |   |   |
| 4 | $CaSO_3$ | 0.37 | 6.5 | 98 | 97 |
|   | $CaCO_3$ | 0.2 |   |   |   |
|   | thiourea | 0.15 |   |   |   |
|   | CuCl | 0.035 |   |   |   |
| 5 | $CaSO_3$ | 0.37 | 6.5 | 98 | 87 |
|   | $CaCO_3$ | 0.2 |   |   |   |
|   | thiourea | 0.15 |   |   |   |
|   | $FeCl_2$ | 0.035 |   |   |   |
| 6 | $CaSO_3$ | 0.37 | 6.5 | 98 | 92 |
|   | $CaCO_3$ | 0.2 |   |   |   |
|   | $Na_2S_2O_3$ | 0.15 |   |   |   |
|   | CuCl | 0.035 |   |   |   |
| 7 | $CaSO_3$ | 0.37 | 6.5 | 98 | 88 |
|   | $CaCO_3$ | 0.2 |   |   |   |
|   | $Na_2S_2O_3$ | 0.15 |   |   |   |
|   | $FeCl_2$ | 0.035 |   |   |   |
| 8 | $CaSO_3$ | 0.37 | 6.5 | 98 | 95 |
|   | $CaCO_3$ | 0.2 |   |   |   |
|   | thiourea | 0.07 |   |   |   |
|   | $Na_2S_2O_3$ | 0.07 |   |   |   |
|   | CuCl | 0.035 |   |   |   |
| 9 | $CaSO_3$ | 0.37 | 6.5 | 98 | 98 |
|   | $CaCO_3$ | 0.2 |   |   |   |
|   | thiourea | 0.15 |   |   |   |
|   | CuCl | 0.02 |   |   |   |
|   | $FeCl_2$ | 0.02 |   |   |   |

EXAMPLE 10

25,000 $Nm^3$/hr of exhaust gas from a sintering furnace containing 190 ppm by volume of NO, 10 ppm by volume of $NO_2$ and 400 ppm by volume of $SO_2$ was treated in accordance with the present process. 100 ppm by volume of $ClO_2$ gas was continuously added to the exhaust gas at a feeding duct through which the gas was fed into a scrubber, whereby NO contained in the gas was converted into $NO_2$. Then, the exhaust gas was continuously fed to the bottom of a scrubbing column comprising four Moredana plates having a free space ratio of 0.33, wherein the exhaust gas was brought into countercurrent contact with a circulating aqueous scrubbing suspension having the composition given below under the following conditions.

| | |
|---|---|
| Superficial gas velocity in the column | 5 m/sec |
| Liquid-gas ratio (L/G) in the column | 4.5 |
| pH of the scrubbing suspension | 6.1 |
| Composition of the circulating scrubbing suspension (mol/liter) | |
| $CaSO_3$ | 0.05 |
| $CaSO_4$ | 0.5 |
| $CaCO_3$ | 0.2 |
| $SC(NH_2)_2$ | 0.1 |
| $EDTA-Cu^{2+}$ | 0.04 |

The $SO_2$ and $NO_x$ contents in the outlet gas from the Moredana scrubbing column were 3 ppm or less and 15 ppm or less, respectively.

The make-up amount of calcium carbonate ($CaCO_3$) was 50 kg/hr, and no calcium sulfite was additionally supplied. The circulating scrubbing suspension was continuously taken out from the system at a rate of 200 liter/hr, and, then, was filtered by using a filter press. The solid calcium sulfate was separated and the resultant filtrate was recirculated to a circulating tank of the scrubbing suspension.

The calcium sulfite contained in the separated solid was oxidized to calcium sulfate ($CaSO_4 \cdot 2H_2O$) and was recovered. The amount of $CaSO_4 \cdot 2H_2O$ thus obtained was 61 kg/hr.

EXAMPLE 11

10,000 $Nm^3$/hr of exhaust gas from an industrial plant containing 250 ppm by volume of NO, 100 ppm by volume of $NO_2$ and 450 ppm by volume of $SO_2$ was treated in accordance with the present process. 130 ppm by volume of $ClO_2$ gas was continuously added to the exhaust gas at a feeding duct through which the gas was fed into a scrubber, whereby NO contained in the gas was converted into $NO_2$. Then, the exhaust gas was continuously fed to the bottom of a scrubbing column comprising three Moredana plates (a perforated plate without weir and downcomer) having a free space ratio of 0.38, wherein the exhaust gas was brought into countercurrent contact with a circulating aqueous scrubbing suspension having the composition given below under the following conditions.

| | |
|---|---|
| Superficial gas velocity in the column | 5 m/sec |
| Liquid-gas ratio (L/G) in the column | 4 |
| pH of the scrubbing suspension | 6.2 |
| Composition of the circulating scrubbing suspension (mol/liter) | |
| $CaCO_3$ | 0.5 |
| $CaSO_3$ | 0.05 |
| $CaSO_4$ | 0.5 |
| $EDTA-Cu^{2+}$ | 0.03 |
| $Na_2S_2O_3$ | 0.12 |

The $SO_2$ and $NO_x$ contents in the outlet gas from the Moredana scrubbing column were 10 ppm or less and 18 ppm or less, respectively.

Contrary to this, when a gas scrubbing test of the above exhaust gas was repeated using the same procedure as set forth above, except that the $EDTA-Cu^{2+}$ compound and $Na_2S_2O_3$ were not incorporated into the scrubbing suspension, the $SO_2$ and $NO_x$ contents in the outlet gas from the Moredana scrubbing column were 10 ppm or less and 180 ppm, respectively.

In the above gas scrubbing test of this invention the make-up amount of calcium carbonate ($CaCO_3$) was 22 kg/hr.

The circulating scrubbing suspension was continuously taken out from the system at a rate of 75 liter/hr and, then, was filtered by using a filter press. The solid calcium sulfate was separated and the resultant filtrate was recirculated to a circulating tank of the scrubbing suspension.

The calcium sulfite contained in the separated solid was oxidized to calcium sulfate and was recovered. The amount of $CaSO_4 \cdot 2H_2O$ thus obtained was 38 kg/hr.

EXAMPLE 12

10,000 $Nm^3$/hr of exhaust gas from an industrial plant containing 250 ppm by volume of NO, 100 ppm by volume of $NO_2$ and 450 ppm by volume of $SO_2$ was purified in accordance with the present process. 130 ppm by volume of $ClO_2$ gas was continuously added to the exhaust gas at a feeding duct through which the gas was fed into a scrubber, whereby NO contained in the gas was converted into $NO_2$. Then, the exhaust gas was continuously fed to the bottom of a scrubbing column comprising three Moredana plates (a perforated plate without weir and downcomer) having a free space ratio of 0.38, wherein the exhaust gas was brought into countercurrent contact with a circulating aqueous scrubbing suspension having the composition given below under the following conditions.

| | | |
|---|---|---|
| Superficial gas velocity in the column | | 5 m/sec |
| Liquid-gas ratio (L/G) in the column | | 4 |
| pH of the scrubbing suspension | | 6.2 |
| Composition of the circulating scrubbing suspension (mol/liter) | | |
| | $CaSO_3$ | 0.5 |
| | $CaCO_3$ | 0.5 |
| | EDTA-$Cu^{2+}$ | 0.03 |
| | thiourea | 0.15 |

The $SO_2$ and $NO_x$ contents in the outlet gas from the Moredana scrubbing column were 10 ppm or less and 15 ppm or less, respectively.

Contrary to this, when a gas scrubbing test of the above exhaust gas was repeated using the same procedure as set forth above, except that the EDTA-$Cu^{2+}$ compound and thiourea were not incorporated into the scrubbing suspension, the $SO_2$ and $NO_x$ contents in the outlet gas from the Moredana scrubbing column were 10 ppm or less and 180 ppm, respectively.

What we claim is:

1. A process for removing nitrogen oxides including nitrogen monoxide and nitrogen dioxide from exhaust gas containing the same comprising the steps of:
    a. oxidizing the nitrogen monoxide into nitrogen dioxide, dinitrogen trioxide or a mixture thereof by adding an oxidizing agent to the exhaust gas, and; then,
    b. contacting, in a scrubbing column, the gas with an aqueous scrubbing suspension having a pH of not less than 4.5 and containing (i) the sulfite of at least one alkaline earth metal, (ii) not less than 0.03 mol/liter of thiourea or thiosulfate of alkali metals, alkaline earth metals and ammonium or mixtures thereof and (iii) not less than 0.003 mol/liter of copper ion or iron ion or a mixture thereof, whereby the nitrogen oxides are reduced to nitrogen.

2. The process as claimed in claim 1, wherein the content of the sulfite, in the scrubbing suspension, is not less than 0.005 mol/liter.

3. The process as claimed in claim 1, wherein the content of the thiourea or the thiosulfate or the mixtures thereof, in the scrubbing suspension, is within the range from 0.05 to 0.4 mol/liter.

4. The process as claimed in claim 1, wherein the content of the copper ion or the iron ion or the mixture thereof, in the scrubbing suspension, is within the range from 0.01 to 0.04 mol/liter.

5. The process as claimed in claim 1, wherein at least a portion of said aqueous scrubbing suspension is subjected to a solid-liquid separation process to separate the sulfate of alkaline earth metals which is produced, in the scrubbing suspension, by the reaction of nitrogen oxides with the sulfite of alkaline earth metals and the resultant liquid is circulated into the scrubbing column as the scrubbing suspension.

6. A process for simultaneously removing sulfur oxides and nitrogen oxides from exhaust gas containing the same comprising the steps of:
    a. oxidizing nitrogen monoxide contained in the nitrogen oxides into nitrogen dioxide, dinitrogen trioxide or a mixture thereof by adding an oxidizing agent to the exhaust gas, and; then,
    b. contacting, in a scrubbing column, the gas with an aqueous scrubbing suspension having a pH of not less than 4.5 and containing (i) the hydroxide or carbonate or mixture thereof, of at least one alkaline earth metal and the sulfite of at least one alkaline earth metal, (ii) not less than 0.02 mol/liter of thiourea or thiosulfate of alkali metals, alkaline earth metals and ammonium or mixtures thereof and (iii) not less than 0.003 mol/liter of copper ion or iron ion or a mixture thereof, whereby the sulfur oxides are converted to sulfites and the nitrogen oxides are reduced to nitrogen.

7. The process as claimed in claim 6, wherein the content of the sulfite, in the scrubbing suspension, is not less than 0.005 mol/liter.

8. The process as claimed in claim 6, wherein the content of the thiourea or the thiosulfate or the mixtures thereof, in the scrubbing suspension, is within the range from 0.05 to 0.4 mol/liter.

9. The process as claimed in claim 1, wherein the content of the copper ion or the iron ion or the mixture thereof, in the scrubbing suspension, is within the range from 0.01 to 0.04 mol/liter.

10. The process as claimed in claim 6, wherein at least a portion of said aqueous scrubbing suspension is subjected to a solid-liquid separation process to separate the sulfate of alkaline earth metals which is produced, in the scrubbing suspension, by the reaction of nitrogen oxides with the sulfite of alkaline earth metals and the resultant liquid is circulated into the scrubbing column as the scrubbing suspension.

* * * * *